(12) United States Patent
Garcia (10) Patent No.: US 6,220,561 B1
(45) Date of Patent: Apr. 24, 2001

(54) COMPOUND FLOATING PIVOT MICROMECHANISMS

(75) Inventor: Ernest J. Garcia, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/346,501

(22) Filed: Jun. 30, 1999

(51) Int. Cl.[7] .............. A47G 1/24; B60R 1/02; G02B 26/00
(52) U.S. Cl. .................. 248/487; 359/290; 359/291
(58) Field of Search .................... 248/487, 484, 248/485, 486, 481, 474, 478, 475.1, 476, 477, 371; 359/290, 291, 224, 225

(56) References Cited

U.S. PATENT DOCUMENTS

| | | | | |
|---|---|---|---|---|
| 4,662,746 | * | 5/1987 | Hornbeck | 350/269 |
| 5,485,304 | * | 1/1996 | Kaeriyama | 359/224 |
| 5,646,928 | * | 7/1997 | Wu et al. | 359/362 |
| 5,652,671 | * | 7/1997 | Knipe et al. | 359/291 |
| 5,926,309 | * | 7/1999 | Little | 359/290 |

* cited by examiner

Primary Examiner—Ramon O. Ramirez
Assistant Examiner—Jerome DeLuca
(74) Attorney, Agent, or Firm—Brian W. Dodson (57) ABSTRACT

A new class of tilting micromechanical mechanisms have been developed. These new mechanisms use compound floating pivot structures to attain far greater tilt angles than are practical using other micromechanical techniques. The new mechanisms are also capable of bi-directional tilt about multiple axes.

38 Claims, 10 Drawing Sheets

COMPOUND FLOATING PIVOT MICROMECHANISMS

This invention was made with Government support under Contract DE-AC04-94DP85000 awarded by the U.S. Department of Energy. The Government has certain rights in the invention.

BACKGROUND

The present invention relates generally to tilting micromechanisms, and more specifically to a new class of micromechanisms able to attain large tilt angles owing to the use of multiple floating pivot structures.

Although there is no precise referent for the term "micromechanical", its common use is to machinery whose size scale makes invalid most of our assumptions about machinery of ordinary dimensions. For example, whereas at ordinary dimensions the strength of materials is usually limited by mechanisms involving motion and multiplication of dislocations in response to applied stress, in the micromechanical regime surface erosion and cleavage modes of failure are more common. Again, whereas at ordinary dimensions fluid lubrication of frictionally related elements (e.g., an axle and a shaft bearing) is one of a handful of practical choices, in the micromechanical regime the viscous shear stress of a lubricant increases in inverse proportion to the size scale of the apparatus, increasing the energy dissipation rate to unusable levels.

When the change in size scale renders conventional practice invalid, it also enables new approaches toward micromechanical functionality. An effective replacement for fluid lubricants can be a surface layer of a solid which is (usually) either amorphous or polycrystalline, is reasonably strong, forms a smooth film on the component surfaces, and has a surface structure that resists bonding with itself.

Consistent with common practice, in this specification the term 'micromechanical' is associated with mechanical apparatus whose functional components have sizes ranging from about 1 mm to about 1 $\mu$m. Such micromechanical apparatus can be made of a wide variety of materials, but perhaps the most common system is a combination of polycrystalline silicon, amorphous silicon, silicon oxides, and silicon nitride. This material system has high material strength and rigidity, high resistance to fracture, can be doped to provide electrically conducting regions, and is relatively easy to directly integrate with microelectronics at a chip level.

A common mechanism in micromechanical apparatus is a tilt stage, whose function is to provide an attached element with a controllable amount of tilt along a predetermined axis or axes. The attached element can be an intrinsic part of the apparatus (e.g., as in an escapement), or an external element which is to be positioned and directed by the apparatus (e.g., a micromirror). The implementations described in this specification will be for micromirror tilt stages, but this should not be taken as an implicit limitation on the scope of the present invention.

Figure 1A:
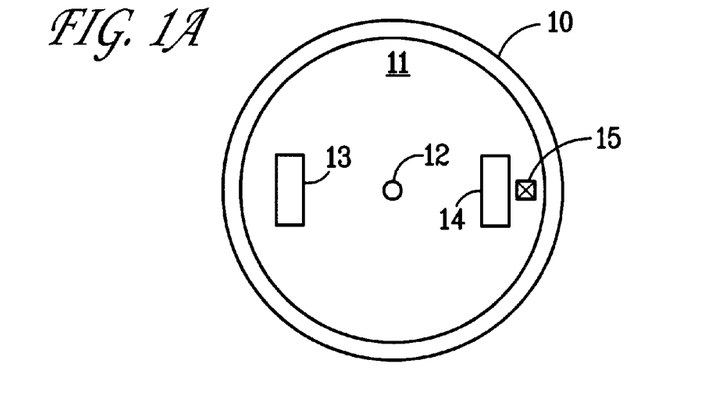
FIG. 1 shows a schematic diagram of a prior art flexible-pivot tilt stage.
Figure 1B:
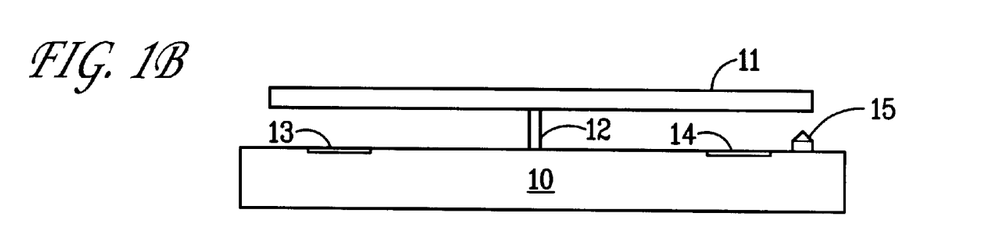

A typical prior art micromirror tilt stage is shown in FIGS. 1a–1d. FIG. 1a shows a transparent top view of the tilt stage, and FIG. 1b shows a side view. Micromirror 11 is mounted on top of base 10 by flexible pivot 12. (Note that 11 could as easily be a mounting platform for a micromirror or for some other component. The present identification is made for simplicity of description, and not to limit the scope of the present invention.) The top surface of micromirror 11, if necessary, is polished flat and/or coated with a reflective layer.

Capacitor plates 13 and 14 provide the forces which tilt the micromirror. In one working arrangement the micromirror is doped to the point of being a good conductor, and is grounded through flexible pivot 12 and base 10, both of which are also appropriately doped. Capacitor plates 13 and 14 are electrically insulated from the base 10. When a voltage is applied to capacitor plate 13, the micromirror 11 tilts to the left. When a voltage is applied to capacitor plate 14, the micromirror 11 tilts to the right.

Figure 1C:
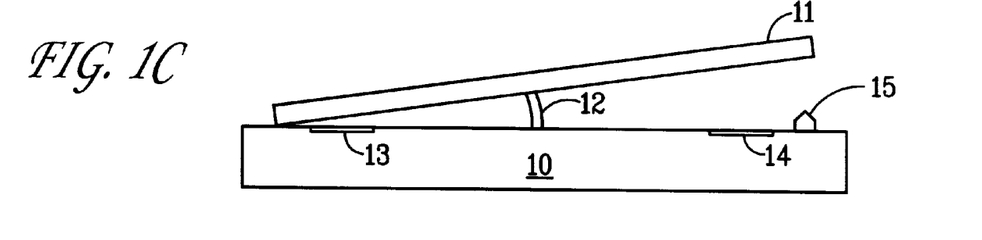

If the applied voltage is large enough, the micromirror 11 will tilt until it hits a solid stop. This condition is of interest for designers, as it provides for a precise amount of tilt, and at the same time helps prevent vibration of the micromirror. Two common solid stops are illustrated here. FIG. 1c shows a maximum leftward tilt, the magnitude of the tilt being limited by contact between the micromirror 11 and the base 10. This provides a limitation in many designs, because the micromirror structure is fabricated by growing layers of structural and sacrificial material on top of the base, and then removing the sacrificial material. Practical limitations of such processes limit the thickness of the sacrificial layers to a few microns at most. A typical micromirror can be perhaps 100 $\mu$m across, with a gap separating the micromirror from the base of about 1 $\mu$m. In this case, the maximum tilt angle is limited to about 1°.

Figure 1D:
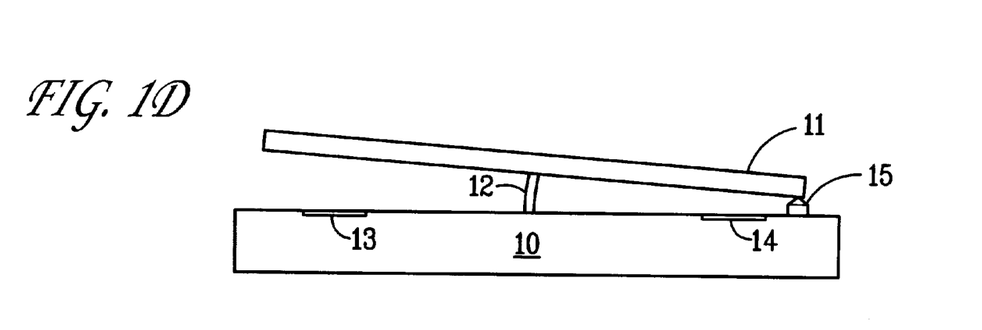

FIG. 1d shows a maximal rightward tilt, where the magnitude of the tilt is limited by the presence of stop post 15. Such a stop post can be used if a smaller maximum tilt is desired than results from contact between the micromirror and the base.

Figure 2:
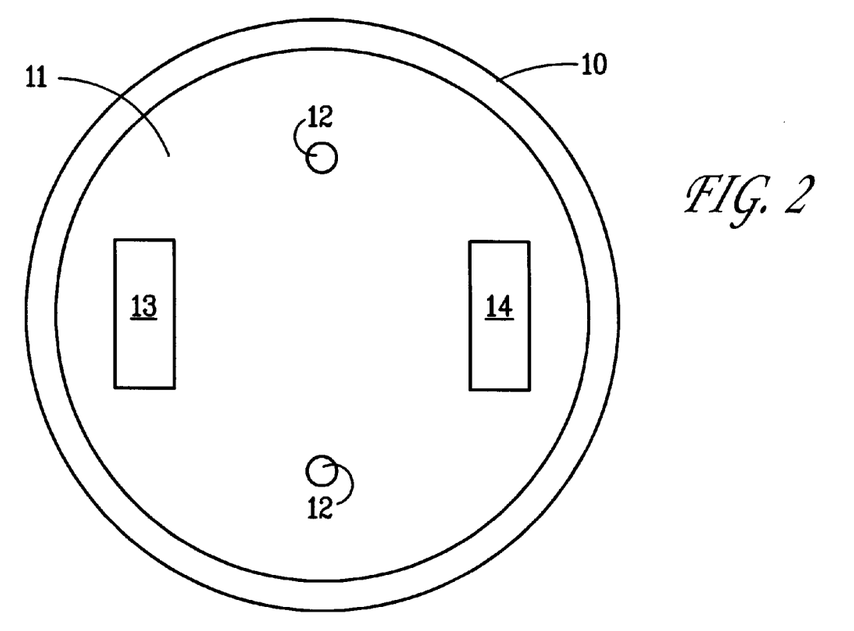
FIG. 2 shows another implementation of a prior art flexible-pivot tilt stage.

The tilt stage described above allows tilt along arbitrary directions. This is desirable for some applications, and not desirable for others. A related tilt stage with an additional torsional pivot can be arranged, as shown in FIG. 2, to define a single restricted tilt axis. Within this specification and the attached claims, a tilt stage has a restricted tilt axis (or multiple restricted tilt axes) only when the structure of the tilt stage substantially restricts the tilting motions of the tilt stage to those corresponding to that restricted tilt axis (or to those restricted tilt axes). Equivalently, the amount of force which must be supplied in the initial stages of tilting about a restricted tilt axis is a local minimum.

In this case of FIG. 2, tilting around the axis defined a line between the two torsional pivots and parallel to the base surface is much easier than in any other direction. This axis is therefore a restricted tilt axis.

Figure 3:
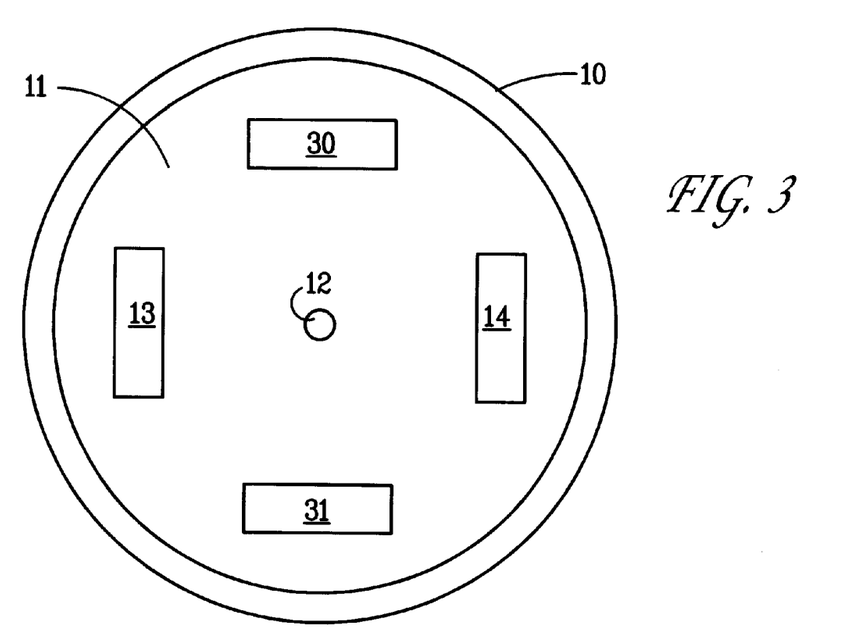
FIG. 3 shows a schematic diagram of a multiaxis prior art flexible-pivot tilt stage.

In another implementation of this prior art device, a second pair of capacitor plates can be added to the base, thereby allowing an arbitrary tilt direction to be driven electrostatically, as shown in FIG. 3.

Many equivalent mechanisms are known in the art. In particular, whereas the pivoting motion was provided above by the bending of a flexible pivot connecting the micromirror to the base, many other structures produce equivalent devices. For example, the micromirror can be attached by a pair of torsional pivots attached to the sides of the micromirror and to a mounting frame which is attached to the base. The top surface of a cantilever beam can be used as a micromirror or as a micromirror mount. Such a cantilever mount can provide multiaxis tit capability when electrostatic actuators are arranged so that both bending of the cantilever and rotation about the cantilever are driven.

Many applications for tilt stages, especially those involving the use of micromirror arrays in active optical processing or display applications, require or can beneficially use larger tilt angles than are accessible using the basic prior art mechanisms described above. However, the process-related limitation to the extent of tilt cannot easily be circumvented, particularly when an array of closely spaced micromirrors is the desired product.

Applicants know of only two prior art tilt stage designs which relieve this tilt angle limitation. Both are limited in mechanical generality and in range of application.

Figure 4A:
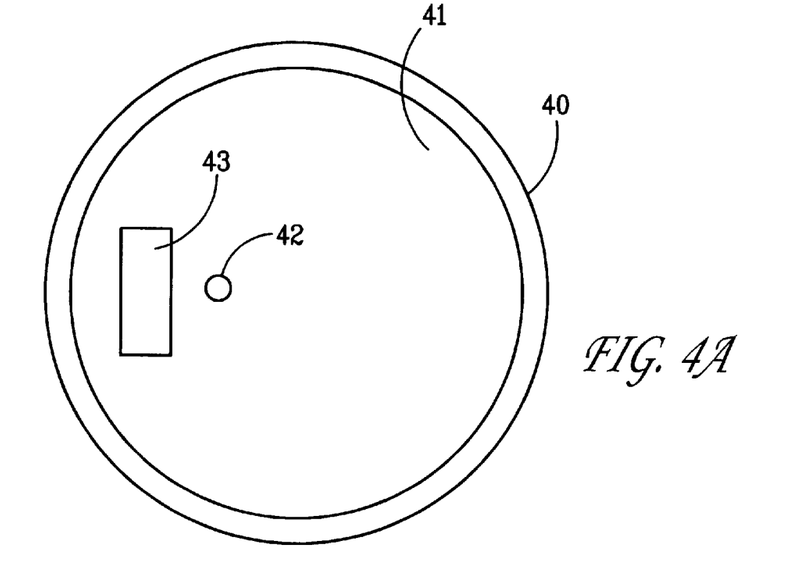
FIG. 4 shows a schematic diagram of an asymmetric pivot prior art flexible-pivot tilt stage capable of yielding large tilt angles in one direction only.
Figure 4B:
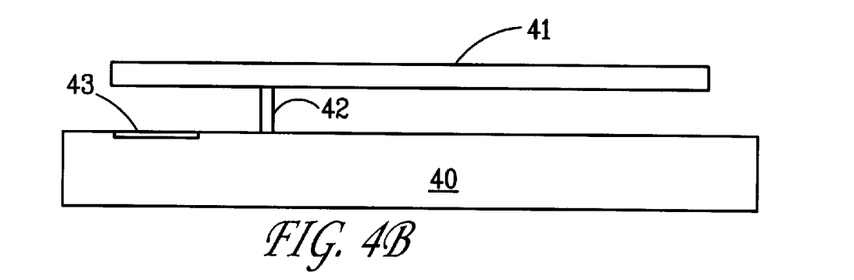
Figure 4C:
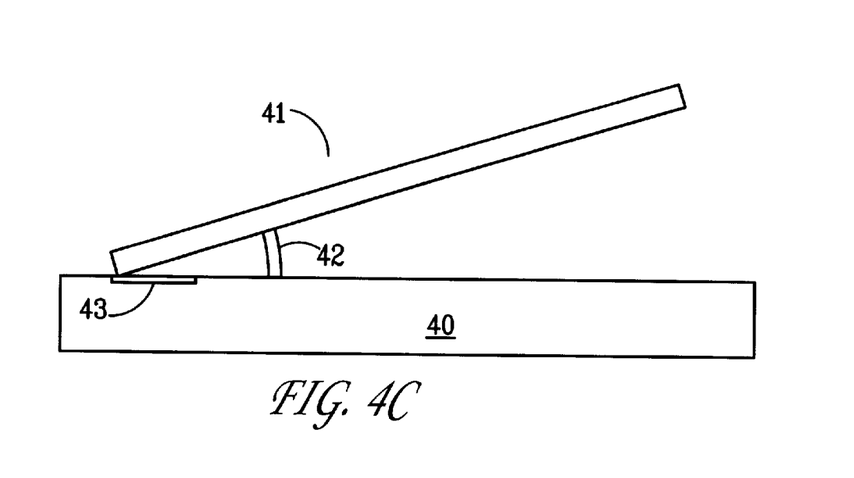

First to be developed was a tilt stage with an eccentrically placed flexible pivot, as shown in FIG. 4a and 4b. This tilt stage is rather similar to that of FIG. 1, having a micromirror 41 attached to a base 40 by a flexible pivot 42, and a capacitor plate 43 to drive motion of the tilt stage when an appropriate potential difference is applied. However, rather than the centrally located flexible pivot of FIG. 1, this flexible pivot is offset toward the capacitor plate. As a result, the maximum tilt angle toward the left (FIG. 4c) is increased by the appropriate geometrical factor, which in practice can be as large as 3–5 times.

This increased tilt angle comes with two costs, however. First, the force provided by the capacitor plate 43 must be considerably larger than that required by a tilt stage after FIG. 1 to obtain the same responsiveness. Second, the increased tilt is only available in one direction—the maximum rightward tilt for this configuration is typically about half that obtained with a central flexible pivot. These limitations combined limit this type of prior art tilt stage to a small number of applications.

The second prior art mechanism which achieves large tilt angles was also developed here at Sandia National Laboratories, and comprises a combination of hinges, sliding bearings, and linear drive mechanisms. Such a mechanism is shown in FIG. 5. Assembled from carefully patterned material and sacrificial layers on a base 500, a micromirror 504 is mounted on top of a mirror frame 503. Mirror frame 503 is rotably fixed to base 500 by a first set of axles 502 attached to mirror frame 503 and rotating in a first pair of bearing blocks 501 which are at the surface of base 500.

Mirror frame 503 is rotably fixed to driving frame 507 by a second set of axles 505 attached to mirror frame 503 and rotating in a second pair of bearing blocks 506 which are attached to driving frame 507. Driving frame 507 is secured to base 500 by a third pair of axles 509 which are attached to the driving frame, and are constrained to slide on the surface of the base by a pair of sliding bearings 508.

Driving frame 507 is moved along the surface of the base by the action of linear transfer beam 513, which transfers motion and force from a bi-directional linear electrostatic actuator comprising comb electrodes 514, 515, 517, and 518. The linear transfer beam 513 is restricted to move substantially along its long axis through the combined action of support bushing 516, beam guides 512, and rotable connection 510 and 511 to the driving frame.

Figure 5A:
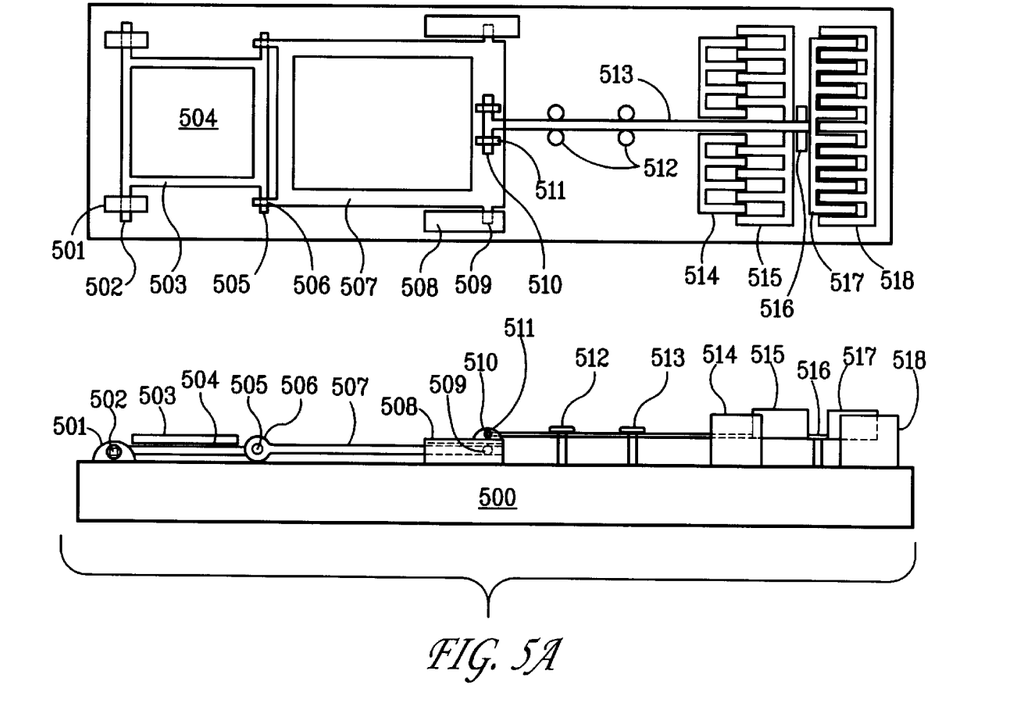
FIGS. 5a–5b shows a schematic diagram of a prior art sliding and hinged tilt stage driven by a linear comb drive.
Figure 5B:
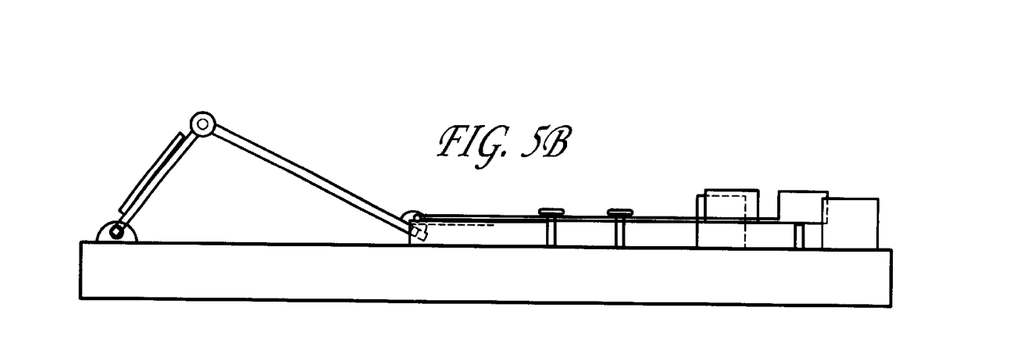

The function of this prior art tilt stage can be understood by comparing the side view of FIG. 5a with FIG. 5b. FIG. 5a shows the 'flat' configuration, in which the electrostatic actuator has pulled linear transfer beam 513 as far to the right as is possible. In the flat configuration the micromirror 504 is in a well-defined position and orientation approximately parallel to the surface of base 500. The exact position can be adjusted in the design phase by placing additional material under either between the micromirror and the mirror frame, or by placing additional material under the mirror frame.

FIG. 5b shows the 'tilted' configuration in which the electrostatic actuator has pushed the linear transfer beam 513 as far to the right as possible. In the tilted configuration micromirror 504 achieves a well-defined position which is tilted at a large angle relative to the surface of base 500.

The device of FIG. 5 offers a number of advantages over the prior art flexible pivot tilt stages. The transition between the flat and the tilted configurations is rapid and energy efficient, and the maximum attainable angle can be as large as 60°. However, the apparatus allows tilt only in one direction, and the mechanism is extremely complex. A related mechanism can be designed which allows bi-directional tilt, but the complexity of the tilt stage increases dramatically. In addition, the design uses a very large amount of surface area relative to the size of the micromirror. Finally, there is considerable looseness in most of the moving joints and connections in the tilt stage, partially because of the basic design and partially because of the tolerances achievable for such joints using current micromechanical fabrication techniques. As a result, this type of prior art tilt stage is only occasionally used for special applications well-suited to its characteristics.

A simple, easily constructed tilt stage capable of large tilt angles, preferably being capable of such action about multiple tilt axes, is badly needed in this realm of the useful arts.

SUMMARY

The present invention is of a new type of micromechanical tilting mechanism, in which compound floating pivots are used to achieve very large tilt angles. This type of mechanism is of particular value in the design and fabrication of micromirror arrays.

DETAILED DESCRIPTION

Figure 6A:
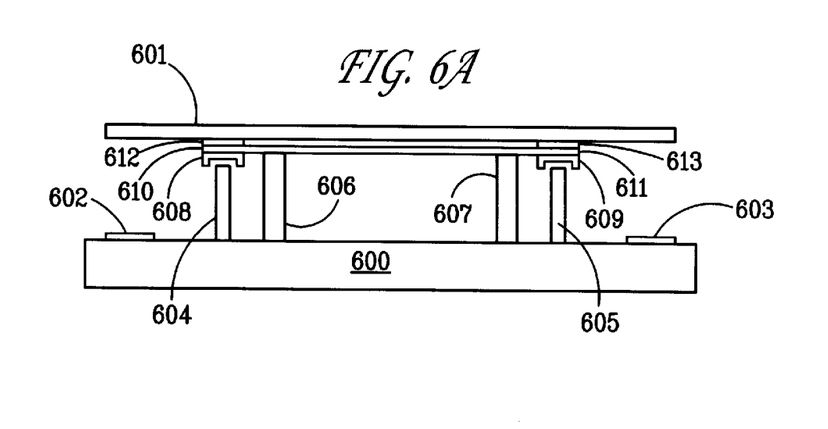
FIG. 6 shows a schematic diagram of a compound floating pivot tilt stage after the present invention.
Figure 6B:
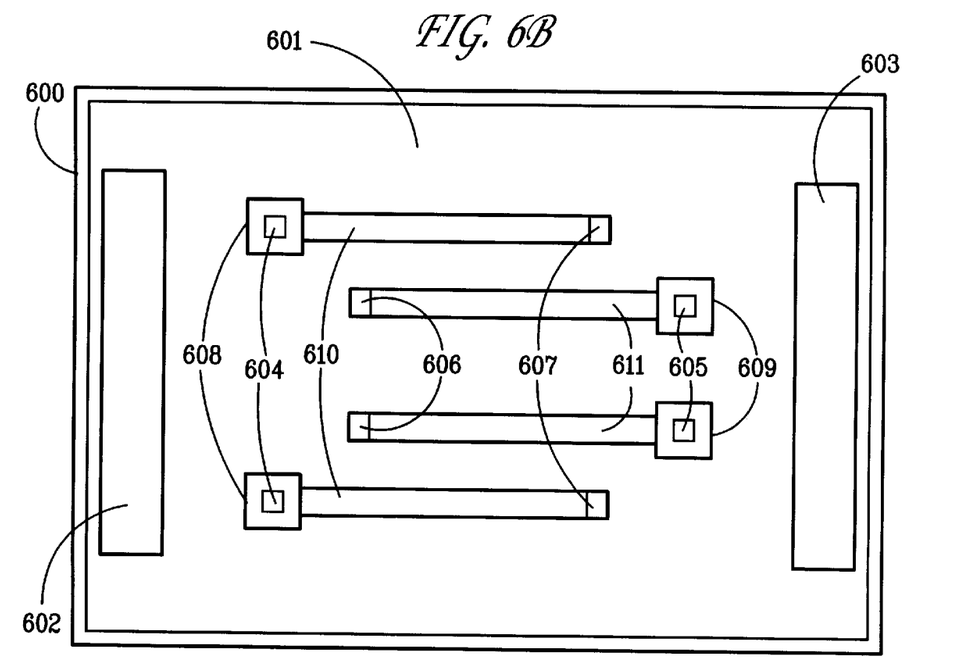

A simple version of a compound floating pivot micromechanism according to the present invention is shown in FIG. 6a (side view) and FIG. 6b (top view). Here a micromirror 601 is floated over a substrate 600 by the action of suspension springs 610 and 611. (As before, although the present invention is being described in terms of a tilt stage for a micromirror, any application suitable for a compound floating pivot mechanism can be substituted without changing the fundamental nature of the present invention.) These springs are secured to substrate 600 by mounting posts 607 and 606, respectively, and to the micromirror by spring attachments 612 and 613, respectively.

As shown, pivot cups 608 and 609 are attached to springs 610 and 611 directly over the points at which the springs attach to the micromirror. This mounting point is not necessary for function, and the pivot cups can be mounted directly on, or otherwise fixedly attached to, the micromirror. Directly below the pivot cups 608 and 609 are pivot rods 604 and 605. The pivot rod ends are not directly attached to the pivot cups, but rather are held in place by the combined action of the suspension springs 610 and 611.

In operation, a voltage from an external powder source (not shown) is applied to capacitor plate 602 (to drive a leftward tilt) or to capacitor plate 603 (to drive a rightward tilt). The micromirror 601 is grounded, thereby forming the other electrode of a capacitor-type electrostatic actuator.

Figure 7A:
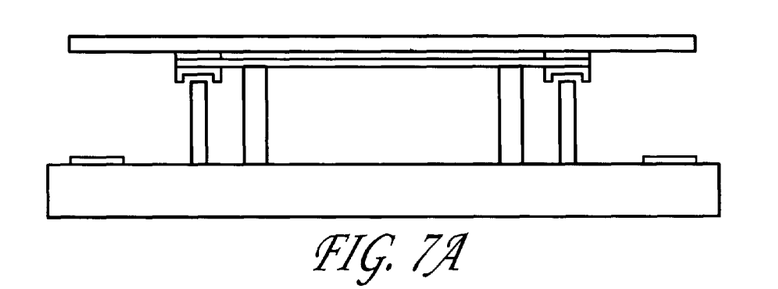
FIG. 7 illustrates the operation of the tilt stage of FIG. 6. The capacity of this device for large magnitude bi-directional tilt is demonstrated.

FIG. 7 illustrates the function of the compound floating pivot micromirror tilt stage described above. FIG. 7a shows the device from the side in its inactive state. When voltage is applied to capacitor plate 602 (referring back to the notation of FIG. 6), an attractive electrostatic force is generated between plate 602 and the grounded micromirror 601, causing the micromirror to tilt toward the left. As it does so, pivot rods 604 enter pivot cups 608, thereupon forming a pair of floating pivots from these two elements which were previously only interrelated by the action of suspension springs 610 and 611.

As the micromirror tilts about an axis defined by the floating pivots, the pivot rods are held within the pivot cups by the restoring force exerted by the suspension springs. As a result, there is nothing particularly special about the use of pivot rods within pivot cups. For example, an edge on a flat surface also suffices to form a floating pivot, as do many other arrangements. A pair of structural elements which satisfy the following conditions will be called a floating pivot—one of the elements is functionally attached to the micromirror, the other is functionally attached to the substrate, and the two elements are aligned so that they make contact and form a true pivot when the micromirror tilts.

Figure 7B:
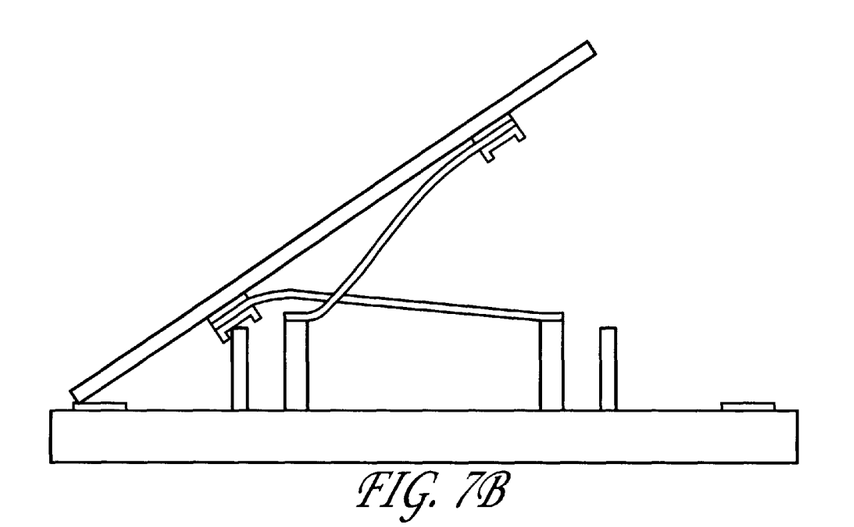

Because these floating pivots are offset from the center of the micromirror, the micromirror is capable of attaining large tilt angles (FIG. 7b). This use of the offset pivot is similar to that of the prior art tilt stage shown in FIG. 4. However, in the present case, bi-directional tilt of the same large magnitude is enabled, a function not possible using the flexible pivots of the prior art.

As the voltage on capacitor plate 602 is reduced, the micromirror returns to its neutral position, the return motion driven by the action of the suspension springs. When in the neutral position, the floating pivot separates into its components again.

Figure 7C:
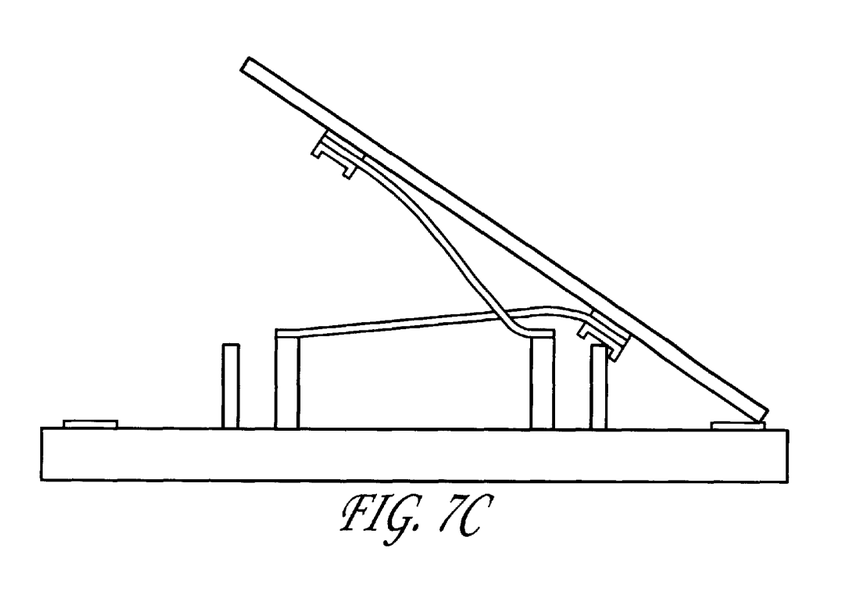

When voltage is applied to capacitor plate 603, a rightward tilt begins. As the tilt increases, pivot rods 605 enter pivot cups 609, thereby forming a second pair of floating pivots. As the tilt increases, it now takes place around the axis defined by the floating pivots, until the same large angle is attained, but in this case resulting from a clockwise rotation (FIG. 7c). (The equality of the maximum tilt angles, of course, is the results of having used a symmetric design in FIG. 6, and is not in any way fundamental to the scope of the present invention.)

The use of an offset pivot (even though it is only a floating pivot) reduces the amount of space available for the capacitor plates. In addition, the moment of inertia of the micromirror about the floating pivot is much larger than the moment that would result from a central pivot. The restoring force of the suspension springs can also be larger than that provided by a flexible pivot. The combination of reduced actuator force, increased moment of inertia, and larger restoring force to be overcome can cause a compound floating pivot mechanism as in FIG. 6 to require very large operational voltages.

There are two main approaches to increase the force generated by the electrostatic actuator. The first is to reduce the size of the gap between the micromirror and the capacitor plate. In this case, however, this approach is counterproductive, because any change in structure which will reduce the effective size of the gap will also reduce the maximum tilt angle of the micromirror stage.

Figure 8A:
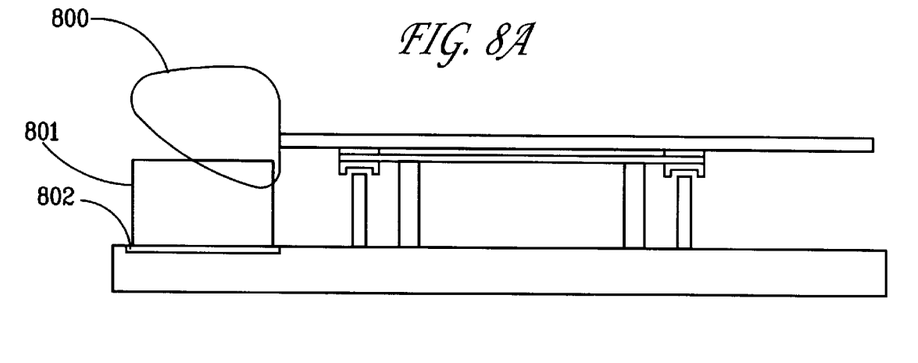
FIG. 8 shows a schematic diagram of a compound floating pivot tilt stage according to the present invention comprising a comb-type electrostatic actuator.
Figure 8B:
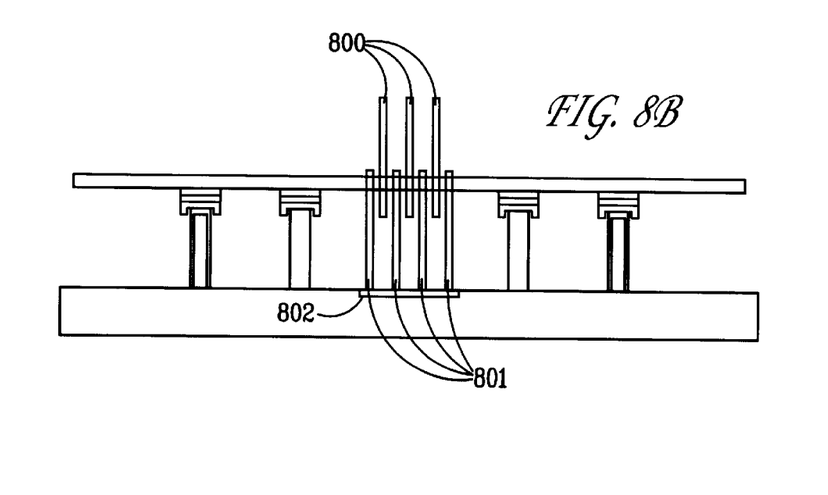

The second approach is to increase the effective area of the actuator. This could be accomplished by replacing the capacitor plate with an interdigitating comb electrostatic actuator, as shown in FIG. 8. Here the large area between micromirror comb plates 800 and substrate comb plates 801 increases the interaction. Electrode 802 insulates substrate comb plates 801 from the substrate, and provides a point at which to apply operating voltage to the device. The force is generated by an increase of capacitance of the comb drive as the micromirror tilts. Such comb drives are commonly used to produce motions in the plane of the substrate, rather than parallel to the substrate as in this case.

Applicants have developed what in many cases is a better alternative, namely the use of an electrostatic actuator with a compliant capacitor surface. This is a new type of electrostatic actuator, invented by the present Applicant, and described in copending U.S. patent application serial number (unknown), filed Jun. 30, 1999, titled 'Electrostatic Actuators with Compliant Capacitor Surface', the specification of which is hereby totally included by reference.

Figure 9A:
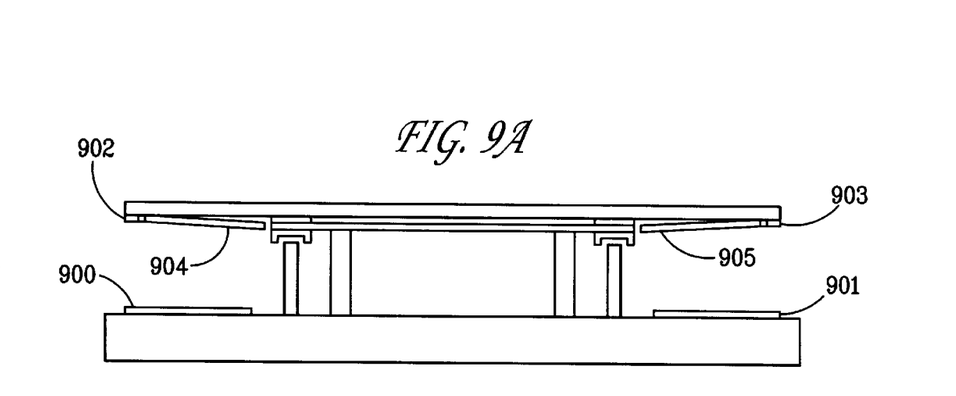
FIG. 9 shows a schematic diagram of a compound floating pivot tilt stage according to the present invention comprising a set of flexible capacitor plates mounted on torsional hinges.
Figure 9B:
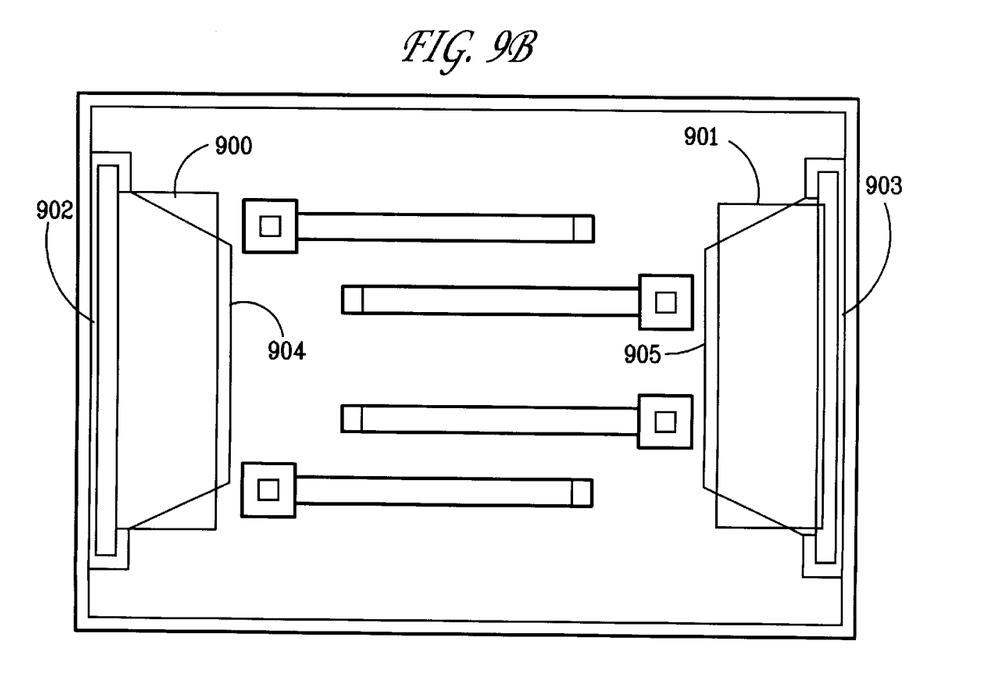

A simplified version of the present invention incorporating a compliant capacitor surface appears in FIG. 9a (side view) and FIG. 9b (top view). The capacitor plates 900 and 901 on the substrate surface are enlarged in size relative to the earlier examples. The new elements are flexible capacitor plates 904 and 905, which are connected to the micromirror via torsional rotary mounts 902 and 903, respectively. Flexible capacitor plates 904 and 905 are shown as drooping slightly in response to gravity. This is done for clarity, as gravitational forces are usually too small to have much influence in the micromechanical regime. The flexible capacitor plates are conductors, and can be grounded to the substrate through the micromirror (although this is not necessary for the desired function). As usual, although the device being described is a tilting micromirror mount, the present invention can be used in conjunction with a wide range of auxiliary mechanisms, and is not intended to be limited to micromirror mounts.

The operation of this implementation of the present invention is shown in FIG. 10. (Reference numbers are those shown in FIG. 9 and earlier figures.) FIG. 10a shows a side view of the inactive device. In FIG. 10b a small voltage has been applied to capacitor plate 900. In response to the resulting electrostatic force, flexible capacitor plate 904 has tilted down toward the surface, primarily through the operation of torsional mount 902. At this stage the force is not large enough to significantly tilt the micromirror or to bend the flexible capacitor plate 904.

Figure 10A:
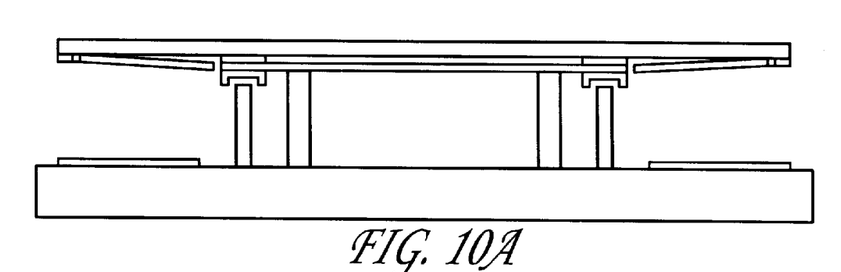
FIG. 10 illustrates the operation of the apparatus of FIG. 9.
Figure 10B:
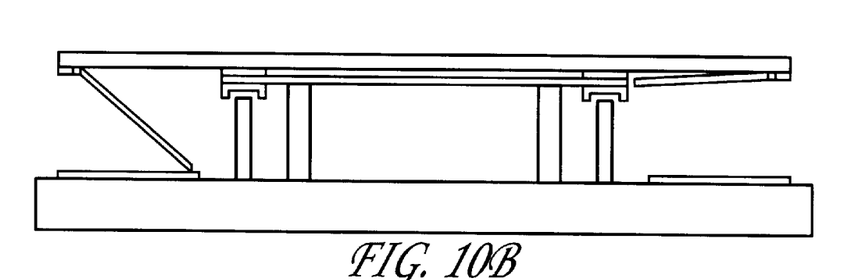
Figure 10C:
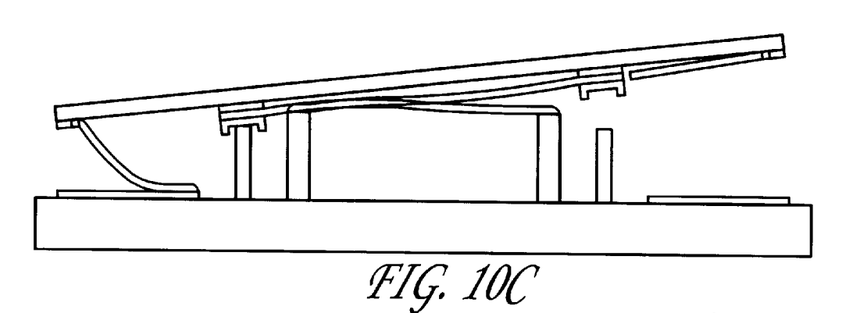

FIG. 10c shows an intermediate state reached after increasing the voltage on capacitor plate 900 to a larger value. Here the micromirror has begun to tilt, pulled down by the electrostatic forces acting to adhere flexible capacitor plate 904 onto capacitor plate 900. The closing force is much greater than in the other implementations shown, as the force is proportional to the inverse square of the gap between the capacitor plates, and the gap is being reduced to essentially the thickness of the native oxides (or other insulating films which are added to the structure shown) as it adheres to the surface. The suspension springs are starting to provide some restoring force, but it is rather small at this point.

Figure 10D:
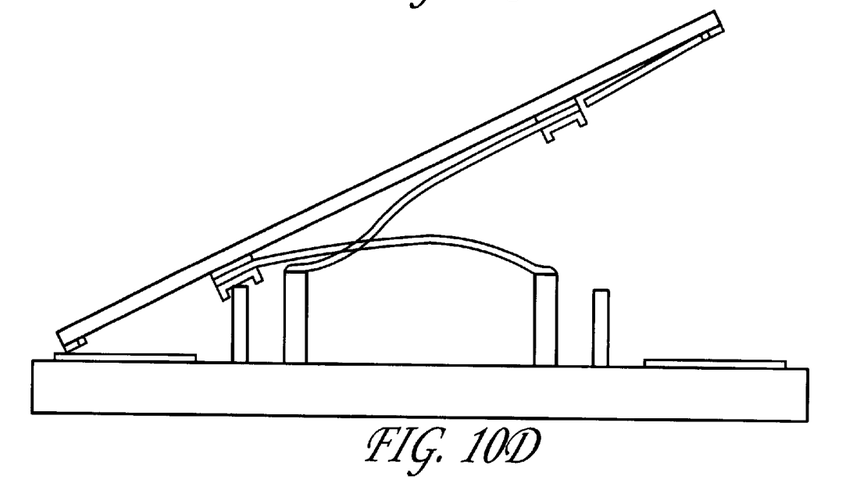

FIG. 10d shows the micromirror tilt stage in its fully tilted condition. The edge of the micromirror is making positive contact with the substrate. As the location of the floating pivot is well-defined by the action of the suspension springs, the micromirror has a fixed and repeatable maximum tilt.

The very large forces which can be provided over a long actuator throw when flexible capacitor plates are used to drive the present compound floating pivot mechanisms makes them ideal companions. Further, fabrication of such relatively complex microstructures is within current state-of-the art fabrication techniques.

Figure 11A:
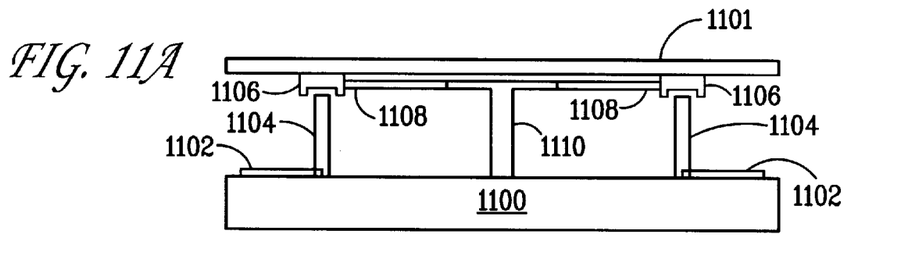
FIG. 11 shows a schematic diagram of a multiaxis compound floating pivot tilt stage according to the present invention.

Finally, note that a compound floating pivot micromechanism according to the present invention is capable not only of bi-directional tilt about a single axis, but also of tilt in both directions about multiple axes. Such a device illustrating the principles of the present invention is shown in FIG. 11a (side view) and FIG. 11b (top view).

Figure 11B:
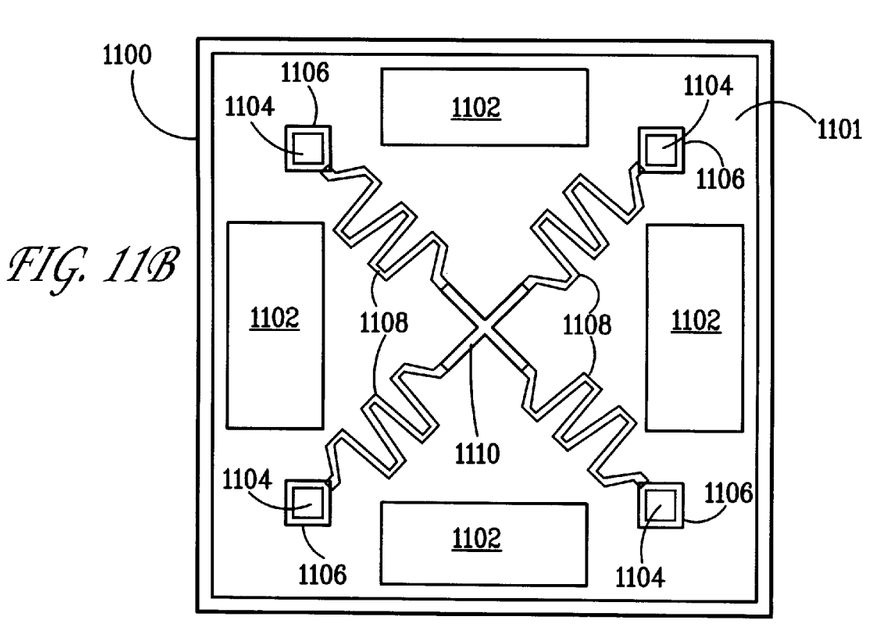

Here a micromirror 1101 is suspended over a substrate 1100 by the action of 4 suspending springs 1108, each of which is connected both to central spring mount 1110 and to one of the four pivot cups 1106. As before, a pivot rod 1104 is positioned under each of the pivot cups, so that a floating pivot will form when the micromirror tilts. Tilting force can be applied bi-directionally about two orthogonal axes by applying voltages to at least one of the capacitor plates 1102. (The two axes need not be orthogonal. Note also that the number of axes need not be limited to two, but can have any number. When large numbers of axes are defined, applying voltages to multiple capacitor plates simultaneously can drive tilt around geometrical averages of the defined axes.)

Figure 11C:
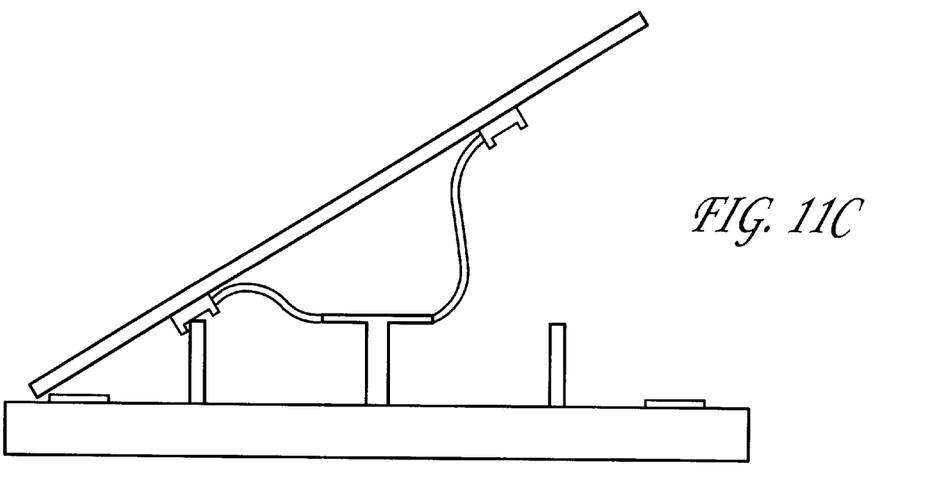

FIG. 11c shows the tilted micromirror mount. The tilting process proceeds in the same manner as before, even though multiple axes are available for tilt. All the earlier comments about forces required, moments of inertia, and so on, apply to these multiple axis compound floating pivot micromechanisms as well.

The examples and implementations described above are intended to illustrate various aspects of the present invention, not to limit the scope thereof. The scope of the invention is set by the claims interpreted in view of the specification.

What is claimed is:

1. A micromechanism comprising a floating pivot, said micromechanism comprising:
   a) a first portion;
   b) a second portion which is to pivot relative to said first portion;
   c) a pivot rod functionally attached to said first portion;
   d) a pivot base functionally attached to said second portion; and,
   e) a suspension attached to said first portion and to said second portion such that the second portion is free to pivot relative to the first portion, and such that the pivot rod and the pivot base are suspended in such relative position as to form the floating pivot between the first portion and the second portion.

2. The micromechanism of claim 1, wherein the mutual configuration of the pivot rod, the pivot base, and the suspension limits said pivoting to a single axis.

3. The mechanism of claim 2, wherein said actuator is electrically activated.

4. The mechanism of claim 3, wherein said actuator is an electrostatic actuator.

5. The mechanism of claim 4, wherein said electrostatic actuator comprises an capacitive electrostatic actuator.

6. The mechanism of claim 5, wherein said capacitive electrostatic actuator comprises a compliant capacitive electrode.

7. The mechanism of claim 6, wherein said compliant capacitive electrode comprises a flexible capacitor plate.

8. The mechanism of claim 4, wherein said electrostatic actuator comprises a comb drive.

9. The mechanism of claim 2, wherein the maximum relative tilt about said axis is equal for clockwise and counterclockwise tilting about said axis.

10. The mechanism of claim 2, wherein said at least one actuator consists of a single actuator.

11. The mechanism of claim 10, wherein the single actuator is attached to the mechanism so that it produces a tilt about a restricted tilt axis.

12. The mechanism of claim 2, wherein said at least one actuator consists of a pair of actuators.

13. The mechanism of claim 12, wherein each of said pair of actuators are attached to the mechanism so that they produce a tilt about a common tilt orientation.

14. The mechanism of claim 2, wherein said at least one actuator consists of multiple actuators.

15. The mechanism of claim 14, wherein said multiple actuators comprise at least one group of actuators, each of said group of actuators being attached to the mechanism so that they produce a tilt about a common tilt orientation.

16. The mechanism of claim 2, wherein the mounting platform is functionally attached to a micromirror.

17. The mechanism of claim 2, wherein the mounting platform comprises a micromirror.

18. The mechanism of claim 1, having at least one restricted tilt axis.

19. The mechanism of claim 18, wherein all of said at least one restricted tilt axis are mutually parallel, thereby defining a common tilt orientation.

20. The mechanism of claim 18, wherein said at least one restricted tilt axis consists of only one restricted tilt axis.

21. The mechanism of claim 1, wherein the mounting platform is functionally attached to a micromirror.

22. The mechanism of claim 1, wherein the mounting platform comprises a micromirror.

23. A micromechanical tilt stage, comprising:
   a) a stage base;
   b) a tilting platform;
   c) a set of spring mounting posts attached to the stage base;
   d) a set of spring attachment points attached to the tilting platform;
   e) at least one floating pivot;
   f) a network of suspension springs attached to said spring mounting points and to said spring attachment points; and, g) at least one actuator functionally attached to the stage base and to the tilting platform so as to produce relative tilt between the stage base and the tilting platform about at least one axis, each of said at least one axis being defined by the relative positions of said at least one actuator and said at least one floating pivot.

24. The tilt stage of claim 23, wherein said stage base comprises a silicon wafer.

25. The tilt stage of claim 23, wherein said tilting platform comprises a micromirror.

26. The tilt stage of claim 23, wherein said tilting platform consists essentially of a micromirror.

27. The tilt stage of claim 23, wherein said tilting platform comprises a reflective metallic layer.

28. The tilt stage of claim 23, wherein said tilting platform consists essentially of a thin slab of silicon.

29. The tilt stage of claim 23, wherein said network of suspension springs consist essentially of silicon.

30. The tilt stage of claim 23, wherein said at least one floating pivot each comprise a first vertical member attached to the stage base and a second vertical member attached to the tilting platform, the first and second vertical members being disposed so as to form a mechanical pivot when some combination of the at least one actuator is activated.

31. The tilt stage of claim 23, wherein each of the at least one actuators are located near the periphery of the mounting platform.

32. The tilt stage of claim 31, wherein each of the at least one actuators is an electrostatic actuator.

33. The tilt stage of claim 32, wherein at least one of the electrostatic actuators comprises a compliant capacitive electrode.

34. The tilt stage of claim 33, wherein said compliant capacitive electrode comprises a flexible capacitor plate.

35. The tilt stage of claim 23, wherein:
 a) said stage base comprises a silicon waver;
 b) said tilting platform comprises a micromirror comprising a thin electrically conducting silicon plate;
 c) said at least one floating pivot each comprise a first comprising a first vertical member attached to the stage base and a second vertical member attached to the tilting platform, the first and second vertical members each consisting essentially of silicon and being disposed so as to form a mechanical pivot when some combination of the at least one actuator is activated;
 d) said network of suspension springs comprises thin silicon sheets; and,
 e) said at least one actuator each comprise a capacitor plate attached to the stage base and means to electrically ground the tilting platform.

36. The tilt stage of claim 35, wherein said micromirror further comprises an optically reflective coating.

37. The tilt stage of claim 36, wherein said optically reflective coating comprises a metallic film.

38. The tilt stage of claim 35, wherein each of said at least one actuator further comprises a compliant capacitive electrode attached to said tilting platform.

* * * * *